United States Patent [19]

Oishi

[11] Patent Number: 4,763,217
[45] Date of Patent: Aug. 9, 1988

[54] OPTICAL TAPE END DETECTOR IN MAGNETIC TAPE CASETTE WITH MEANS TO COMPENSATE FOR MISALIGNMENT OF LIGHT SOURCE AND REFRACTING

[75] Inventor: Kengo Oishi, Kanagawa, Japan

[73] Assignee: Fuji Photo Film Co., Ltd., Kanagawa, Japan

[21] Appl. No.: 894,539

[22] Filed: Aug. 8, 1986

[30] Foreign Application Priority Data

Nov. 5, 1985 [JP] Japan .................. 60-169150

[51] Int. Cl.$^4$ .................................. G11B 23/02
[52] U.S. Cl. .................................. 360/132
[58] Field of Search ............. 360/132, 74.6; 242/197, 242/198, 199, 188; 350/444, 286, 287

[56] References Cited

U.S. PATENT DOCUMENTS

| 3,615,155 | 10/1971 | Gelbman ............. 242/199 X |
| 3,638,955 | 2/1972 | Wada .................. 242/199 |
| 3,705,699 | 12/1972 | Siller ................. 242/199 |
| 4,032,987 | 6/1977 | Singer et al. ........ 360/132 |
| 4,631,618 | 12/1986 | Ozawa et al. ....... 360/132 |

FOREIGN PATENT DOCUMENTS 0146490 8/1984 Japan .................. 360/137

Primary Examiner—Robert S. Tupper
Assistant Examiner—Andrew L. Sniezok
Attorney, Agent, or Firm—Sughrue, Mion, Zinn, Macpeak & Seas

[57] ABSTRACT

A magnetic tape cassette in which an L-shaped prism reflects externally applied light through the tape to an external light detector in order to detect a transparent end of the tape. The light receiving end of the prism has the shape of a convex lens in order to correct misaligned externally applied light.

5 Claims, 2 Drawing Sheets

OPTICAL TAPE END DETECTOR IN MAGNETIC TAPE CASETTE WITH MEANS TO COMPENSATE FOR MISALIGNMENT OF LIGHT SOURCE AND REFRACTING

BACKGROUND OF THE INVENTION

1. Field of the Invention

This invention relates to magnetic tape cassettes.

More particularly, the invention relates to a novel compact magnetic tape cassette for audio devices or the like which is equal to or smaller than the "Philips" type magnetic tape cassette in size.

2. Background Art

Recently, cassette tape recorders have been remarkably decreased both in size and in weight. Accordingly, magnetic tape cassettes for the reduced-size recorders have also been miniaturized. In the field of audio recorders, there has been a strong demand for the provision of magnetic tape cassette which are suitable for high-quality high-density signal recording and reproducing operations that are continued for long periods of time. In order to meet this reqirement, a magnetic tape cassette has been proposed in the art which is operated according to a digital system such as a pulse code modulation (PCM) system. In a PCM system, unlike an analog system, input signals are converted into pulse signals for signal recording and reproducing operations. For the magnetic tape cassette, the recording frequency band of the magnetic tape must be about five times as wide as that of a conventional audio tape. For this reason, large video tape cassettes affording a wider recording frequency band than the compact audio cassette have extensively employed.

Video tape cassettes, except for special ones, are operated according to the rotary head system, and are so designed that they are provided with a guard panel which is adapted to close the opening formed in the front part of the cassette and which is swingable upwardly of the front of the cassette. That is, the digital system uses the magnetic tape cassette in high-density wide-frequency-band signal recording and reproducing operations which have a short recording wavelength in comparison with the conventional audio compact cassette. Therefore, the cassette's structure should be such that the magnetic tape therein is sufficiently protected.

The technical concept of the invention is applicable not only to video tape cassettes but also to audio tape cassettes for a signal recording and reproducing system employing a relatively wide frequency band. And the magnetic tape cassette is equal to or smaller in size than the conventional audio compact magnetic tape cassette. That is, the magnetic tape cassette is an extremely small one.

There has been proposed a mechanism in which, when a signal recording or reproduction operation is carried out with the above-described magnetic cassette, at the end of the tape running operation, the end of the tape is detected in order to stop the operation of the signal recording and reproducing device. In one example of the mechanism, a transparent tape is connected to the end of the magnetic tape. That is, a light emitting element and a light receivng element are arranged on both sides of a tape running section so as to detect whether or not a light beam emitted by the light emitting element is transmitted through the tape to the light receiving element to thereby detect the end of the tape. However, the light emitting element and the light receiving element are provided in the signal recording and reproducing device. In the case of a conventional large video tape cassette, there is room in the cassette. Therefore, the cassette may be so designed that the light emitting element or the light receiving element goes into the cassette so as to be placed behind the tape. However, since the magnetic tape cassette to which the technical concept of the invention is applied is small in size, it is considerably difficult to modify the cassette in such a manner that the light emitting element or the light receiving element can go into the cassette. That is, there has been no choice but to arrange the two elements outside of the cassette.

Accordingly, a magnetic tape cassette has been proposed in the art which is so designed that an L-shaped prism 1 is provided within the cassette as shown in FIG. 1 so that a light beam emitted by a light emitting element 8 is refracted towards the rear side of the magnetic tape 10 and is refracted again so as to traverse the tape running path thereby to reach a light detecting element 9. The prism 1 is made of transparent material, and comprises a horizontal part 3 having a light receiving part 2, and a vertical part 4. The top and the bottom of the vertical section 4 are formed into a first inclined reflecting surface 5 and the second inclined reflecting surface 6.

The prism is fixed adjacent the right wall of a cassette 11, as shown in FIG. 2 with the light receiving part 2 and the second reflecting surface 6 directed outwardly of the cassette 11. The cassette 11 is composed of a lower case half 12 and an upper case half 13. Two hubs 14 inside the cassette 11 reel the tape 7. In this invention, cuts or through-holes 15 and 16 are formed in the cassette case 11 so that the light receiving part 2 and the second reflecting surface 6 are not covered by the cassette case 11. That is, the light receiving part 2 and the second reflecting surface 6 are exposed to the outside through through-holes 15 and 16 respectively. The cassette 11 also includes a rotatable front lid 17 and a slidable side slider 18. When the front lid 17 and the side slider 18 are respectively rotated and slid to expose the tape 7 to a tape head during operation, the through-holes 15 and 16 are also exposed to the exterior. Thus dust and the like cannot enter the cassette 11 through the through-holes 15 and 16 when the cassette 11 is not in use.

The magnetic tape 7 is run above the horizontal part 3 of the prism 1 while facing the second reflecting surface 6. On the other hand, the signal recording and reproducing device has a light emitting element 8 which is confronted with the through-hole 15 and thus the light receiving part 2 of the prism 1. The light detecting element 9 is confronted with the through-hole 16 and thus through the magnetic tape 7 with the second reflecting surface 6. When, in the case where a light beam emitted by the light emitting element 8 is applied to the prism 1 through the light receiving part 2, the magnetic tape 7 is run across the horizontal part 3 of the prism 1, the light beam reflected from the second reflecting surface 6 does not reach the light receiving element 9. On the other hand, when the transparent tape 10 connected to the end of the magnetic tape 7 is run across the horizontal part 5 of the prism 1, the light beam reflected from the second reflecting surface 6 reaches the light detecting element 9 through the transparent tape 10. It is detected in this manner whether or not the light beam emitted by the light emitting element 8 reaches the light receiving element 9, to thereby detect the end of the magnetic tape 7.

The light receiving part 2 of the prism 1 is flat. Therefore, if the light receiving part 2 is not correctly directed toward the light emitting element 8, that is, if the light beam from the light emitting element 8 is not perpendicularly applied to the light receiving element 2, then the quantity of light applied to the prism 1 is decreased, so that the light beam cannot reach the light receiving element 9. In this situation therefore the end of the magnetic tape cannot be accurately detected.

SUMMARY OF THE INVENTION

Accordingly, an object of the invention is to eliminate the above-described difficulty accompanying a conventional magnetic tape cassette.

More specifically, an object of the invention is to provide a magnetic tape cassette which is so designed that the tape end can be accurately detected.

According to the invention, a magnetic tape cassette contains a pair of hubs on which a magnetic tape is wound and a prism for receiving external light and refracting the light towards a tape running region. The hubs and the prism are located in the internal space formed by the upper half and the lower half of the cassette case. According to the invention, the prism has a light receiving part which is in the form of a convex lens.

That is, the light receiving part of the prism has a light concentrating function, being in the form of a convex lens. Therefore, even if the light receiving part is slightly shifted from the front surface of the light emitting element in the signal recording and reproducing device, light emitted by the light emitting element is applied to the prism through the light receiving part, and accurately refracted. Therefore, the end of the magnetic tape can be detected with high reliability.

DETAILED DESCRIPTION OF THE PREFERRED EMBODIMENTS

One embodiment of the invention will be described with reference to the accompany drawings.

Figure 1:
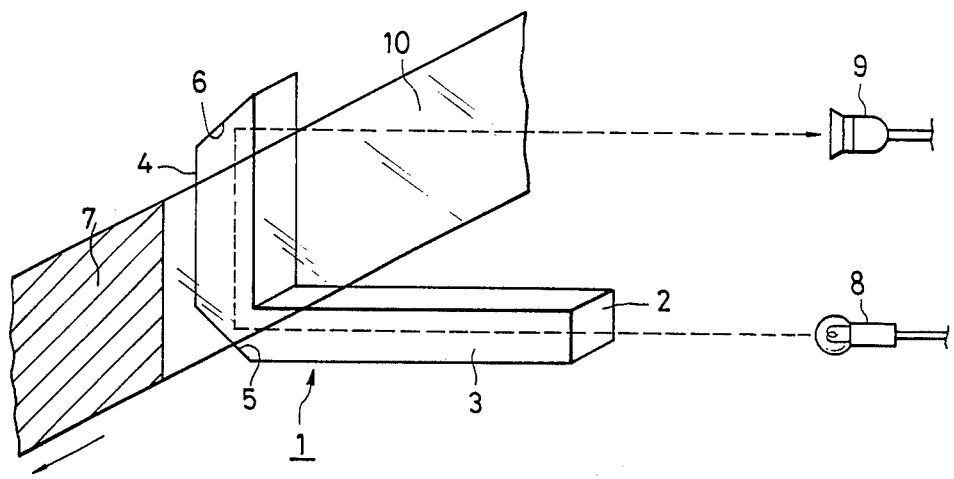
FIG. 1 is a perspective view showing a prism provided in a conventional magnetic tape cassette.
Figure 3:
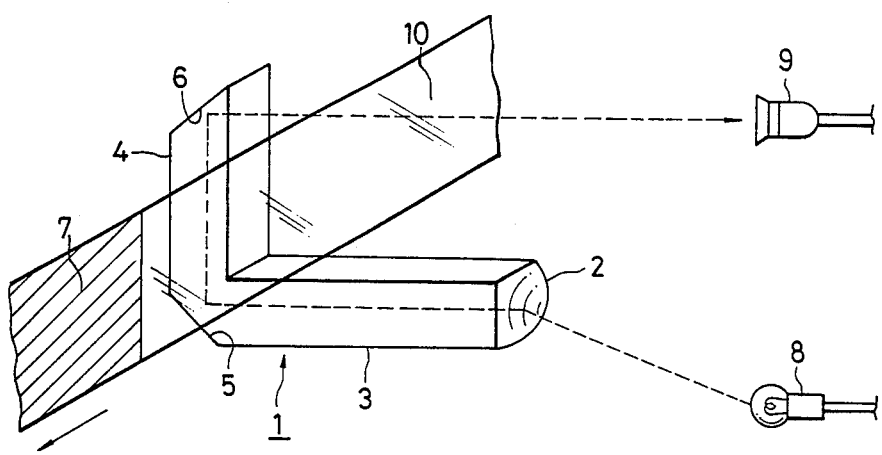
FIG. 3 is a perspective view showing a prism provided in a magnetic tape cassette according to this invention.
Figure 2:
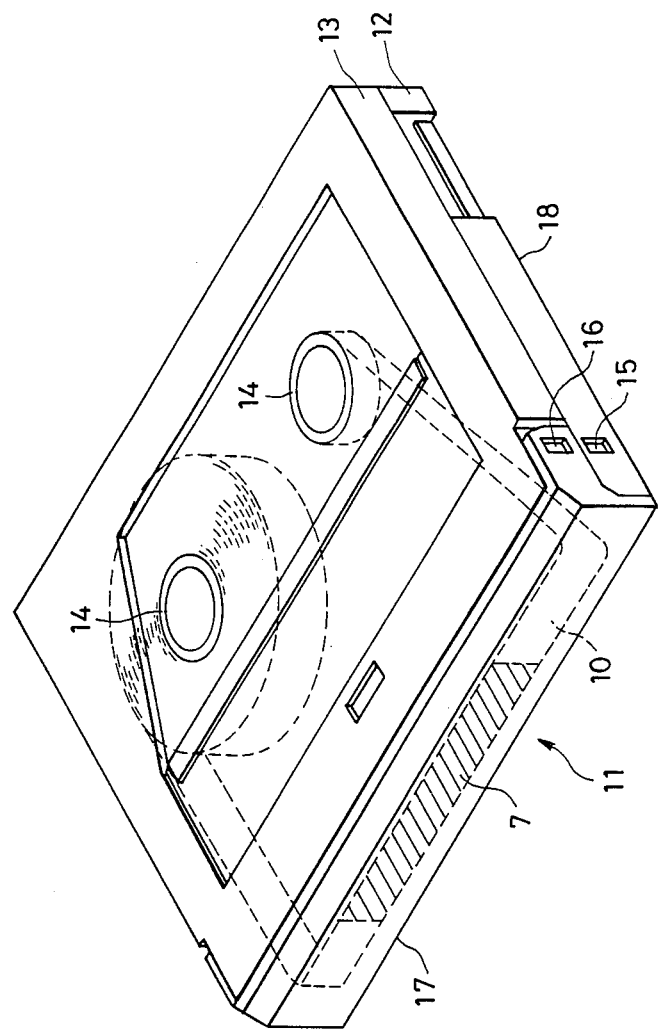
FIG. 2 is an external perspective view of a tape cassette.

FIG. 3 is a perspective view of a prism 1 located inside a magnetic tape cassette according to the invention. The prism 1 is molded of transparent plastic resin so that it is L-shaped and comprises a horizontal part 3 and a vertical part 4. The horizontal part 3 has a convex-lens-shaped light receiving part 2 at its end. The vertical part 4 has a first reflecting surface 5 and a second reflecting surface 6 at either end. The prism 1 is so designed that, for instance, the horizontal part 3 is fixedly secured to the bottom of the upper or lower half with the light receiving part 2 facing outwardly of the cassette. The light receiving part 2 is confronted with the light emitting element 8 and the first reflecting surface 6 is confronted with the light detecting element 9 of a signal recording and reproducing device through cuts or through-holes 15 and 16 formed in the cassette case 1. When the cassette 1 is loaded into the signal recording and reproducing device, a light beam emitted by the light emitting element 8 is applied to the prism 1, reflected in a vertical direction by the first reflecting surface 5, and reflected in a horizontal direction by the second reflecting surface 6, so that it is applied to the light detecting element 9. On the other hand, the magnetic tape 7 is run over the horizontal part 3 of the prism 1 while facing the vertical part 4, so that the light beam refracted by the second reflecting surface 6 goes across the magnetic tape 7 running path at all times.

As was described above, the light receiving part 2 of the prism 1 is in the form of a convex lens. Therefore, even if the light emitting element 8 is not correctly confronted with the light receiving part 2 of the prism 1, for instance, it is slightly shifted vertically or horizontally with respect to the light receiving part 2, the light beam from the light emitting element 8 is concentrated by the convex-lens-shaped light receiving part 2 and refracted by the prism 1. The light beam thus correctly traverses the tape running path to reach the light detecting element 9. It is preferable that the light emitting element 8 is located on the extension of the central axis of the horizontal part 3 of the prism 1. However, even if the light emitting element 8 and the light receiving part 2 are shifted from each other in an allowable range during operation, the light beam from the light emitting element 8 can propagate in parallel with the central axis of the prism 1 after being obliquely applied to the convex-lens-shaped light receiving part 2.

While the magnetic tape 7 is running over the prism 1, the light beam refracted by the second reflecting surface cannot reach the light detecting element 9, being blocked by the opaque magnetic tape 7. However, when the transparent tape 10 connected to the end of the magnetic tape 7 runs over the prism 1, the light beam refracted by the second reflecting surface 6 passes through the transparent tape 10 to reach the light detecting element 9. The light detecting element 9 is electrically connected to means for controlling the drive system of the signal recording and reproducing device in such a manner that, when the light beam passed through the transparent tape 10 is detected by the light receiving element 9, the operation of the signal recording and reproducing device is stopped.

As is apparent from the above-description, the light detecting element 9 detects the light beam from the light emitting element 8 which has passed through the prism 1 and the transparent tape 10, so that the end of the magnetic tape 7 is accurately detected. Simultaneously in association with the detection of the light beam, the signal recording and reproducing device, and especially a magnetic tape running device source, can be stopped. That is, simultaneously when the magnetic tape is wound to its end, the running of the magnetic tape is stopped, which can prevent the difficulty that an excessively large tensile force is applied to the magnetic tape.

The above-described prism 1 may be fixedly secured to the upper half or the lower half 12 or 13. However, in order to observe the magnetic tape in the cassette, it may be integrally formed together with a transparent window member placed over an aperture of the upper half 12 of the case to permit inspection of the tape wound on the hubs 14. The window member is molded with a transparent material similar to that required for the prism 1.

According to the invention, the light receiving part of the prism is in the form of a convex-lens, thus having a light concentrating function. Therefore, even when the light emitting element does not correctly confront the light receivng part of the prism or the quantity of light from the light emitting element is small, the minimum quantity of light which can be sensed by the light detecting element is transmitted to it. That is, the magnetic tape cassette of the invention has high reliability in that the end of the magnetic tape can be positively detected.

What is claimed is:

1. A tape cassette, comprising:
    a case having an upper half and a lower half with an internal space therebetween;
    hubs mounted in said internal space for transporting a recording tape past a tape running region;
    means for detecting an end region of said tape, including a prism member (1), disposed in said internal space, for receiving light at a light receiving end (2) thereof and refracting said light to direct said light toward said tape at said tape running region, wherein said light receiving end includes a convex outer surface comprising a lens for concentrating said light within said prism.

2. A tape cassette as recited in claim 1, wherein said prism member is an L-shaped prism having two legs, a first inclined surface between said two legs and a second inclined surface at an end opposite said light receiving end.

3. A tape cassette as recited in claim 2, wherein said tape running regions is located between said second inclined surface and a first wall of said case.

4. A tape cassette as recited in claim 3, wherein said first wall contains two holes facing said light receiving end and said second inclined surface, respectively.

5. A tape cassette as recited in claim 1, wherein said prism member is disposed on one side of said tape, said end region is transparent, and said means for detecting further includes light detecting means for detecting said light directed toward said tape, said light detecting means being disposed on the other side of said tape, opposite to said prism member.

* * * * *